March 5, 1940.　　　　S. CLAUSEN　　　　2,192,179
TOBACCO CUTTING ROLLER
Filed Jan. 16, 1937

INVENTOR
Sigurd Clausen
BY
George S. Hastings
ATTORNEY

Patented Mar. 5, 1940

2,192,179

UNITED STATES PATENT OFFICE 2,192,179

TOBACCO CUTTING ROLLER

Sigurd Clausen, Brooklyn, N. Y., assignor to International Cigar Machinery Company, a corporation of New Jersey Application January 16, 1937, Serial No. 120,939

4 Claims. (Cl. 131—98)

This invention relates to improvements in cutting mechanism for cigar machines.

It is a common practice in the formation of cigar binders and wrappers to spread leaves over dies of cutting beds and cut therefrom suitable binders or wrappers. In order to make clean cuts it is necessary that the coacting cutting mechanism with its rollers pass over the leaves and sever all portions of the wrapper or binder, as the case may be, from the leaf. It is, therefore, particularly desirable that the rollers rotate easily and smoothly along the edges of the die, and at the same time maintain a uniform pressure along the entire edge of the die as the cutting progresses in order to make a clean cut. It is accordingly an object of this invention to provide a cutting mechanism having novel roller mountings which may be more easily adjusted with respect to the die of a cutting bed for more effectively cutting wrappers or binders from said leaves.

It is a further object of the invention to provide leaf cutting rollers having bearings which are self aligning, which are provided with eccentric mountings at one end to control their inclination to the die, and which may easily be adjusted to proper cutting position relative to leaves spread upon a cutting die.

It is a further object to provide leaf cutting rollers having self-aligning bearings mounted to maintain suitable cutting relation to the edge of the cutting die and adapted to position the rollers in proper cutting position with respect to the cutting die.

It is a further object of the invention to provide hollow cutting rollers which are of relatively light weight in construction, which have self-aligning bearings allowing them to be correctly positioned with respect to the cutting die and leaves positioned thereon, and which make a more easily operated and quicker cutting mechanism.

Cutting rollers mounted upon cone or ball point bearings have been used successfully for this purpose in the past but it has been found that the bearings did not stand up very well due to excessive wear thus making it necessary to replace the same quite often. It is therefore, an additional object of this invention to provide easily adjustable straight, hollow cutting rollers having self-aligning bearings which can be used over a long period of time without requiring frequent replacement due to wear of the bearings.

With these and other objects not specifically mentioned in view, the invention consists in certain constructions and combinations which will be hereinafter fully described, and then specifically set forth in the claims hereunto appended.

In the accompanying drawing which forms a part of this specification, and in which like characters of reference indicate the same or like parts:

Figure 1:
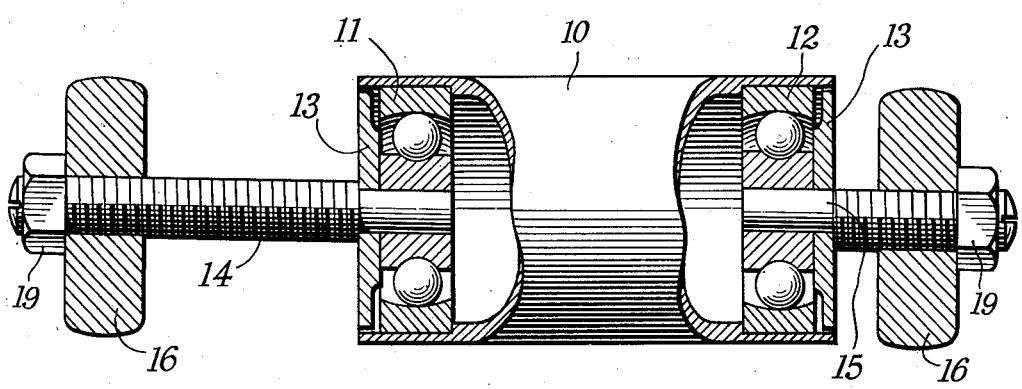
Fig. 1 is a sectional view of a hollow roller showing an eccentric mounting at one side and self-aligning bearings constructed in accordance with my invention.
Figure 2:
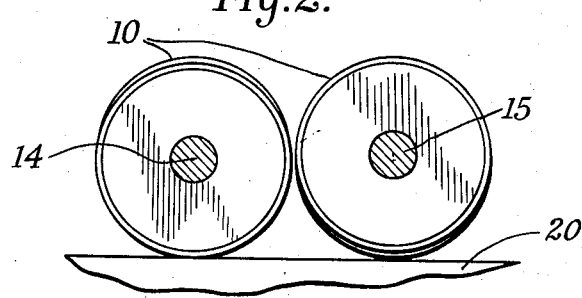
Fig. 2 is an end view of the rollers showing their relation to the cutting surface of the die.
Figure 3:
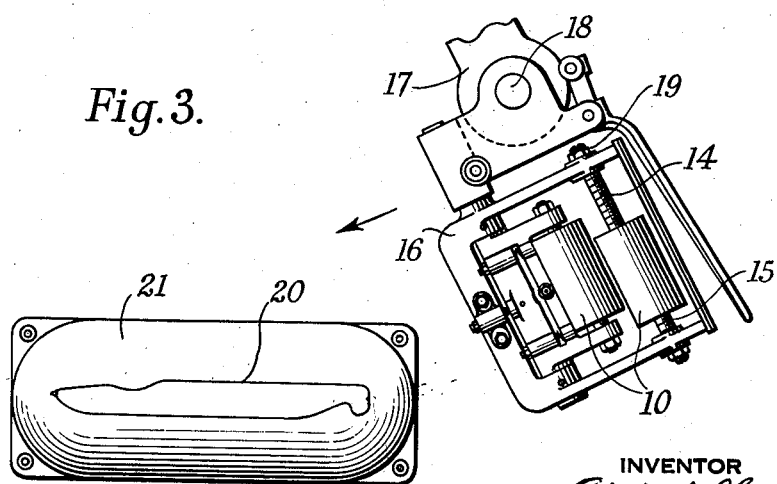
Fig. 3 is a view showing the wrapper cutter mechanism and the related die and cutting bed.

Referring to Figs. 1 and 3, straight hollow rollers 10 are provided with suitable self-aligning bearings 11 and 12 which in the illustrated embodiment are of the ball bearing type secured in the rollers adjacent their ends. By means of the self-aligning feature of these bearings, the roller may be adjusted to any inclination to the cutting die and will always run free. This is due to their construction and to the shape of the bearing race which allows free movement of the balls therein at all times regardless of the position of the rollers. The rollers may be provided with washers 13 located adjacent the bearings and preferably exteriorly thereof, and are mounted for rotation on shafts 14 and 15. The shafts which may be threaded along a part of their lengths as shown in Fig. 1, are supported in frame 16 mounted on a cutting arm 17 of conventional design at 18. By means of this construction the rollers may be adjusted axially in the frame 16 to proper cutting position therein and held in this position by nuts 19. Each shaft 15 has an eccentric end at its bearing 12. This allows the rollers to be adjusted by rotation of the shaft, to and from the die so that the inclination of each roller can be changed whenever desired, while at the same time the self-aligning bearings are adjusted to maintain the rollers in proper cutting position. When two rollers are supported in frame 16, according to the arrangement shown in Fig. 3, eccentric shafts 15 are adjusted so that each roller will be inclined at a slight angle in the opposite direction (Fig. 2). This adjustment of the rollers is readily effected by rotating these shafts in the proper direction until the desired roller inclination is reached, and then securing them in adjusted position by means of nuts 19. The eccentric shaft arrangement with both eccentric shafts on the same side of the frame 16 may be modified somewhat, and the same results be obtained by reversing the positions of the eccentric shafts 15 in said frame with one on each side so that each roller will be tilted at a slight angle in an opposite direction. Each of the eccentrically mounted rollers 10 provided with self-aligning bearings is adapted in this manner to maintain a proper relation for effectively cutting wrapper or binder leaf sections from leaves placed and held by suction upon die 20, which die may be of well known construction, such for instance of the type shown in Patent No. 1,876,027, granted to W. H. Schussler, September 6, 1932. The light, hollow construction of these rollers and the elimination of the necessity of overcoming the usual inertia of solid rollers contribute to the ease and speed of operation, and effect more rapid and efficient cutting.

The various means referred to may be varied in construction within the scope of the claims, for the particular device selected to illustrate the invention is but one of many possible concrete embodiments of the same. The invention is not, therefore, to be restricted to the precise details of the structure shown and described.

What is claimed is:

1. In a bearing device for a leaf cutting roller adapted to cooperate with a stationary cutting die of a tobacco leaf cutting mechanism, a frame having spaced parallel arms, axially aligned threaded openings in said arms, a threaded shaft secured in each of said threaded openings, a reduced portion on each shaft located between the arms, one of said reduced portions being eccentric with respect to the threaded portion of its shaft, a guard washer positioned in abutting relation with a shoulder formed by the reduced portion of each shaft, a bushing adjacent each guard mounted on the reduced portion of each shaft, said reduced portions being of elongated cylindrical shape so as not to interfere with axial movement of said shafts relative to the bushings, each bushing having an external race, a companion race external to and in the same plane as each bushing, said bushings and races being positioned between the guards, the external diameter of said second race being larger than the external diameter of said guard washer, ball bearings between the races adjacent each guard, and a roller having the interior thereof reduced at its end so as to fit in fixed relation onto the external peripheral wall of each second race, while being spaced from the external periphery of each guard washer.

2. In a wrapper cutting device including a wrapper die and rolling mechanism coacting with the die to cut a tobacco leaf thereon, wherein said rolling mechanism consists of a frame having spaced members adapted for to and fro action over said die, axially aligned threaded openings in said members, a threaded shaft secured in each of said threaded openings, reduced portions on each shaft located between the members, one of said reduced portions being eccentric with respect to the threaded portion of its shaft, a bushing mounted on the reduced cylindrical portion of each shaft, said reduced portions being of elongated cylindrical shape so as not to interfere with axial movement of one of the shafts relative to the bushing, each bushing having an external race, a companion race arranged externally of and in the same plane as each of said bushings, a roller having the interior thereof hollow so as to receive within the body of the same the said external races, anti-friction elements between said bushing races and said external races so constructed and arranged as to permit tilting of the roller with respect to said shafts about an axis transverse to the axis of the roller without binding on said anti-friction elements so as to permit tilting of said roller only by rotation of the shaft having the eccentric reduced portion to adjust the angular relationship of said roller to said die.

3. In a tobacco leaf cutting mechanism, the combination with a leaf cutting die upon which the leaves to be cut are positioned, of a cutting device movable across said die to cut sections from said leaves, said devices including a frame adapted to move across said die having spaced members arranged to receive the roller between them, axially aligned threaded openings in said members, a threaded shaft threaded into each of said threaded openings, reduced portions on each of said shafts, one of said reduced portions being eccentric with respect to the threaded portion of its shaft, self aligning bearings surrounding and carried by said reduced portions and connected to said leaf cutting roller to rotatably mount the same on said frame for angular tilting adjustment relative to said die only by rotation of the shaft having the eccentric reduced portion without causing binding of the bearings, said bearings comprising inner races surrounding said reduced portions, said reduced portions being of cylindrical shape so as not to interfere with axial movement of the shafts relative to the bushings, outer races secured within the operating surface of said roller between the ends thereof, anti-friction means intermediate said inner and outer races, said anti-friction means and said outer races being constructed and arranged to be self aligning and to permit tilting of the outer race relative to the inner race without substantially affecting the bearing clearances.

4. In a wrapper cutting device including a wrapper guide and rolling mechanism coacting with the guide to cut a tobacco leaf thereon, wherein said rolling mechanism consists of a frame having spaced members adapted for to and fro motion over said die, axially aligned openings in said members, a shaft secured in each of said openings, with one of said shafts being secured in its opening for adjustment both axially and rotatively, portions on each shaft located between the members, said portion of said adjustable shaft being eccentric with respect to the shaft, a bushing on said portions of each of said shafts, said portions being of elongated cylindrical shape, each bushing having an external race, a companion race arranged externally of and in the same plane as each of said bushings, a roller having the interior thereof hollow so as to receive within the body of the same the said external races, anti-friction elements between said bushing races and said external races so constructed as to permit tilting of the roller with respect to said shafts, and said die without binding on said anti-friction elements so as to permit tilting of the roller only by rotation of the shaft having the eccentric reduced portion to adjust the angular relationship of said roller to said die.

SIGURD CLAUSEN.